United States Patent
Ryoo et al.

(10) Patent No.: US 11,171,874 B2
(45) Date of Patent: Nov. 9, 2021

(54) METHODS OF LOSSLESS TRAFFIC FORWARDING USING DISTRIBUTED DELAY OFFSET MATCHING

(71) Applicant: Electronics and Telecommunications Research Institute, Daejeon (KR)

(72) Inventors: Yeoncheol Ryoo, Daejeon (KR);
Jeong-dong Ryoo, Daejeon (KR);
Taesik Cheung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 4 days.

(21) Appl. No.: 16/570,404

(22) Filed: Sep. 13, 2019

(65) Prior Publication Data
US 2020/0106710 A1    Apr. 2, 2020

(30) Foreign Application Priority Data

Sep. 27, 2018  (KR) ................... 10-2018-0115232
Jan. 28, 2019  (KR) ................... 10-2019-0010452

(51) Int. Cl.
| | | |
|---|---|---|
| *H04L 12/841* | (2013.01) | |
| *H04L 12/947* | (2013.01) | |
| *H04L 12/911* | (2013.01) | |
| *H04L 12/835* | (2013.01) | |
| *H04L 12/823* | (2013.01) | |

(52) U.S. Cl.
CPC ............ *H04L 47/283* (2013.01); *H04L 47/30* (2013.01); *H04L 47/32* (2013.01); *H04L 47/726* (2013.01); *H04L 49/252* (2013.01)

(58) Field of Classification Search
CPC ... H04L 47/283; H04L 49/252; H04L 47/726; H04L 47/30; H04L 47/32; H04L 45/22; H04L 45/121; H04L 45/70; H04L 45/42; H04L 45/64; H04L 47/34
See application file for complete search history.

(56) References Cited

U.S. PATENT DOCUMENTS

| | | | |
|---|---|---|---|
| 2013/0114448 A1 | 5/2013 | Koo | |
| 2017/0093732 A1* | 3/2017 | Akhavain Mohammadi | ............... H04L 45/72 |
| 2017/0331727 A1 | 11/2017 | Ryoo et al. | |
| 2018/0069908 A1* | 3/2018 | Buchanan | ............... H04L 12/18 |

FOREIGN PATENT DOCUMENTS

| | | |
|---|---|---|
| KR | 10-2004-0069873 A | 8/2004 |
| KR | 10-2015-0017592 A | 2/2015 |
| KR | 10-2018-0071993 A | 6/2018 |

\* cited by examiner

*Primary Examiner* — Walter J Divito
(74) *Attorney, Agent, or Firm* — Rabin & Berdo, P.C.

(57) ABSTRACT

Disclosed are methods lossless traffic forwarding using distributed delay offset matching. The lossless traffic forwarding method includes calculating a delay offset between a first forwarding path between a transmitting node and a receiving node and a second forwarding path between the transmitting node and the receiving node, and controlling a buffer resource by an extent of the delay offset to delay packets to be forwarded on the first forwarding path.

14 Claims, 5 Drawing Sheets

METHODS OF LOSSLESS TRAFFIC FORWARDING USING DISTRIBUTED DELAY OFFSET MATCHING

CROSS-REFERENCE TO RELATED APPLICATION(S)

This application claims the priority benefit of Korean Patent Application No. 10-2018-0115232 filed on Sep. 27, 2018, and Korean Patent Application No. 10-2019-0010452 filed on Jan. 28, 2019, in the Korean Intellectual Property Office, the disclosures of which are incorporated herein by reference for all purposes.

BACKGROUND

1. Field

One or more example embodiments relate to a network protection switching technique, and more particularly, to a lossless traffic forwarding method that enables traffic forwarding without a disconnection in the event of a failure or a fault occurring on a traffic forwarding path or in the event of restoration of the traffic forwarding path from the failure.

2. Description of Related Art

In the field of network technology, there has been ongoing research and development on industrial convergence network technology that enables a single network to simultaneously receive generally managed traffic and time-sensitive traffic such as real-time remote controllable traffic. For example, efforts for the research and development include time-sensitive networking (TSN) of Institute of Electrical and Electronics Engineers (IEEE) 802.1 working group, deterministic networking (DetNet) of Internet Engineering Task Force (IETF).

Main functions provided by such networking technology include a lossless forwarding function of forwarding traffic without a disconnection in the event of a failure or a fault occurring on a traffic forwarding path on a network or in the event of restoration of the traffic forwarding path from the failure. The lossless forwarding function is defined by IEEE Std 802.1 CBTM-2017 frame replication and elimination for reliability (FRER) in the TSN, and by a packet replication and elimination function in the DetNet. A fundamental operating method of these is the same as that of International Electrotechnical Commission (IEC) 62439-3 high-availability seamless redundancy (HSR). The operating method is as follows.

Two or more traffic transmission or forwarding paths may be set between a transmitting node through which traffic is received by or input to a network and a receiving node configured to output traffic to an outside of the network. Here, the traffic forwarding paths may need to be separate from each other such that they are not disconnected simultaneously in the event of a single failure occurring in the network. The transmitting node may insert, in a packet overhead, sequence numbers in order of packets of traffic being received and then transmit it to a plurality of forwarding paths. The receiving node may verify the sequence numbers of the packets received from the forwarding paths, and transmit, to an outside of the network, only packets to which sequence numbers not previously received are attached and determine the previously received packets to be duplicate or redundant packets and eliminate the determined packets. Through such packet replication and elimination, a packet loss may not occur when at least one of the forwarding paths is normal despite a failure occurring in the network.

However, there may be a challenge in that delay times of the forwarding paths set between the transmitting node and the receiving node are different from one another.

SUMMARY

An aspect provides distributed delay deviation matching technology to effectively match delay times in forwarding packets on a plurality of forwarding paths set for lossless forwarding by using buffer resources of network nodes on the forwarding paths.

Another aspect also provides software-defined networking (SDN)-based control and management technology for distributed delay deviation matching technology.

According to an example embodiment, there is provided a lossless packet forwarding method including calculating a delay offset between a first forwarding path between a transmitting node and a receiving node and a second forwarding path between the transmitting node and the receiving node, and controlling a buffer resource by an extent of the delay offset to delay packets to be forwarded on the first forwarding path.

The calculating may include calculating a forwarding delay time of the first forwarding path, calculating a forwarding delay time of the second forwarding path, and calculating the delay offset based on the forwarding delay time of the first forwarding path and the forwarding delay time of the second forwarding path.

The delay offset may be a difference between the forwarding delay time of the first forwarding path and the forwarding delay time of the second forwarding path.

The buffer resource may be disposed in at least one of nodes disposed on the first forwarding path.

The nodes may include intermediate nodes disposed between the transmitting node and the receiving node, and the receiving node.

The controlling may include receiving size information of the buffer resource from a node at which the buffer resource is disposed, and generating delay time information for delaying a packet through the buffer resource based on the size information.

The controlling may further include transmitting the delay time information to the node at which the buffer resource is disposed.

The size information of the buffer resource may be available size information of the buffer resource.

When the node at which the buffer resource is disposed is an intermediate node disposed between the transmitting node and the receiving node, the generating of the delay time information may include generating delay time information of the intermediate node by a value of a traffic transmission period unit. When the node at which the buffer resource is disposed is the receiving node, the generating of the delay time information may include generating, as delay time information of the receiving node, a difference between the delay offset and the delay time information of the intermediate node.

According to another example embodiment, there is provided a control device including a communication module configured to communicate with a transmitting node and a receiving node, and a controller configured to calculate a delay offset between a first forwarding path between the transmitting node and the receiving node and a second forwarding path between the transmitting node and the receiving node, and control a buffer resource by an extent of the delay offset to delay packets to be forwarded on the first forwarding path.

The controller may calculate a forwarding delay time of the first forwarding path and a forwarding delay time of the second forwarding path, and calculate the delay offset based on the forwarding delay time of the first forwarding path and the forwarding delay time of the second forwarding path.

The delay offset may be a difference between the forwarding delay time of the first forwarding path and the forwarding delay time of the second forwarding path.

The buffer resource may be disposed in at least one of nodes disposed on the first forwarding path.

The nodes may include intermediate nodes disposed between the transmitting node and the receiving node, and the receiving node.

The controller may receive size information of the buffer resource from a node at which the buffer resource is disposed through the communication module, and generate delay time information for delaying a packet through the buffer resource based on the size information.

The controller may transmit the delay time information to the node at which the buffer resource is disposed.

The size information of the buffer resource may be available size information of the buffer resource.

When the node at which the buffer resource is disposed is an intermediate node disposed between the transmitting node and the receiving node, the controller may generate delay time information of the intermediate node by a value of a traffic transmission period unit. When the node at which the buffer resource is disposed is the receiving node, the controller may generate, as delay time information of the receiving node, a difference between the delay offset and the delay time information of the intermediate node.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
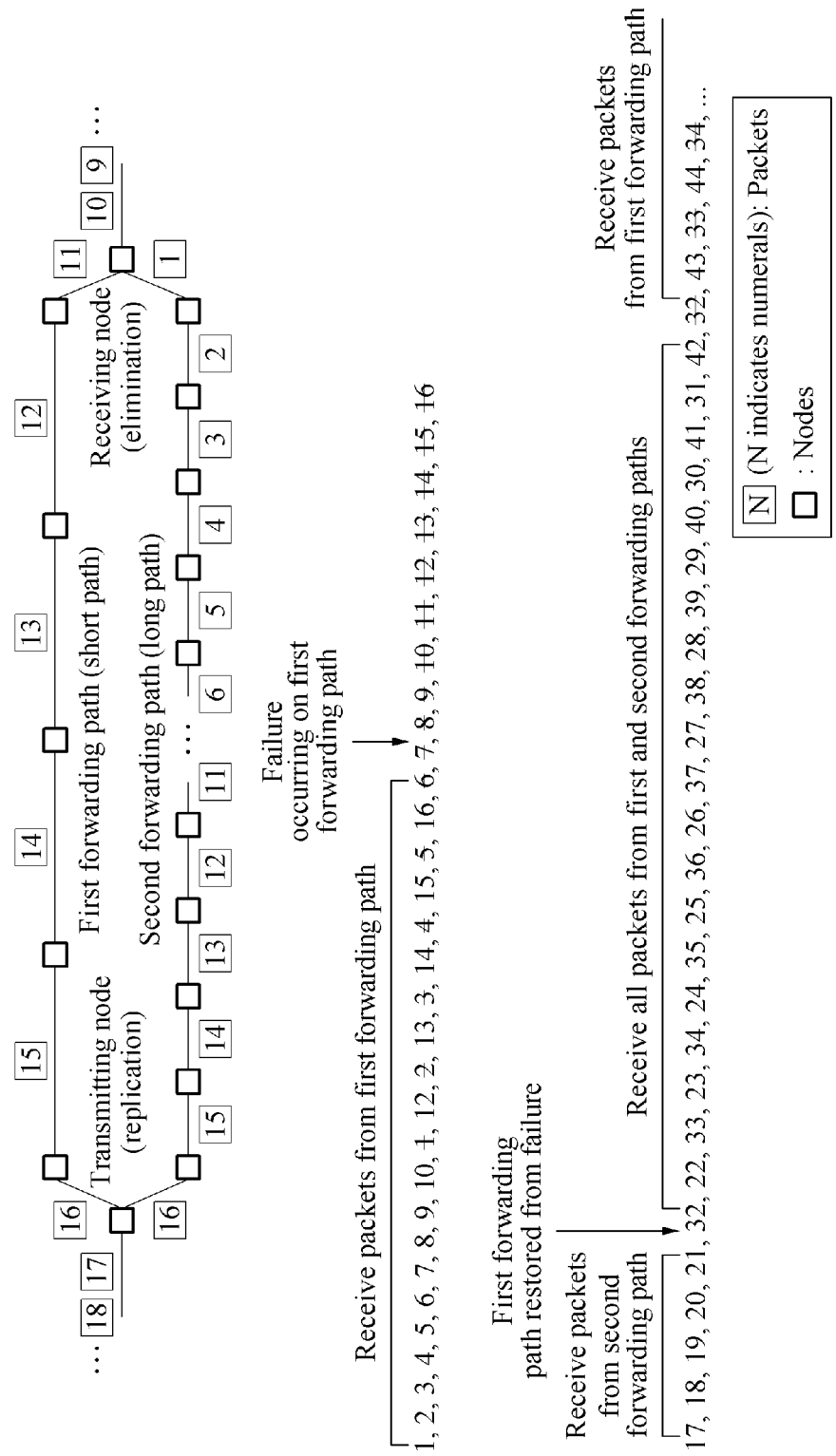
FIG. 1 is a diagram illustrating an example of traffic forwarding on a network according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of traffic forwarding on a network according to an example embodiment.

In the example of FIG. 1, it is assumed that two forwarding paths are disposed between a transmitting node and a receiving node for the convenience of description. When two forwarding paths are physically separated from each other not to be simultaneously affected by a single failure or a fault on a network, respective forwarding delay times of the two forwarding paths may be different from each other.

In this example, the two forwarding paths include a first forwarding path and a second forwarding path. The first forwarding path is a path having a relatively short forwarding delay time, and the second forwarding path is a path having a relatively long forwarding delay time.

For example, when a forwarding delay time of the first forwarding path and a forwarding delay time of the second forwarding path are different by an extent of a time used to forward ten packets, the receiving node first receives first through 11th packets through the first forwarding path, and then receives the first packet through the second forwarding path. As illustrated in FIG. 1, the receiving node determines first through 16th packets that are received through the first forwarding path to be valid packets and accepts the packets, and determines the first through fifth packets that are received through the second forwarding path to be duplicate packets and eliminate the packets. When a failure occurs on the first forwarding path immediately after the receiving node receives the 16th packet through the first forwarding path, the receiving node determines a 17th packet and packets subsequent to the 17th packet that are received through the second forwarding path to be valid packets and accepts the packets.

Such operations described in the foregoing are associated with a lossless packet forwarding function. Through this, it is possible to forward packets without a loss in the event of a failure on the first forwarding path. However, packets may not be received by the receiving node during a time corresponding to a difference between a forwarding delay time of the first forwarding path and a forwarding delay time of the second forwarding path. For example, when such a difference in terms of forwarding delay time between the first forwarding path and the second forwarding path is extremely large as in a large-scale ring network, sessions managed by two terminal devices connected to the network may be expired and the terminal devices may be temporarily disconnected.

In addition, when the first forwarding path is restored from the failure, a more severe issue may occur. When the first forwarding path is restored from the failure immediately after receiving packets including a 21st packet from the second forwarding path, the receiving node simultaneously receives packets including a 32nd packet and packets subsequent to the 32nd packet from the first forwarding path and packets including a 22nd packet and packets subsequent to the 22nd packet from the second forwarding path. Here, the receiving node receives packets for a predetermined amount of time, for example, by receiving the 32nd packet from the second forwarding path, and accept, as valid packets, all the packets received from both the first and second forwarding paths until a duplicate packet eliminating function operates.

That is, when the first forwarding path is restored from the failure, a mis-ordering issue may occur during the time corresponding to the difference in terms of forwarding delay time between the first forwarding path and the second forwarding path, and thus orders of packets to be output (or withdrawn or forwarded) from the receiving node to an outside of the network may be switched. Such mis-ordering issue may be solved by correcting an order error at an application end of a terminal device when the terminal device connected to the receiving node has a sufficient data processing capability. However, low-cost sensors and actuators used in industrial Internet of things (IoT) may not have a satisfying level of processor performance that is sufficiently high to correct such an order error.

In addition, such a situation in which packets are received simultaneously from both the forwarding paths for a predetermined amount of time when the first forwarding path is restored from a failure may cause a more severe issue in a time-deterministic packet network of, for example, time-sensitive networking (TSN) and deterministic networking (DetNet). A time-deterministic packet forwarding function that ensures a maximum forwarding delay time of a packet to be less than or equal to a preset value may operate normally only when traffic to be input to a network node complies with a preset rule or regulation. However, when the receiving node accepts all the packets received from both the forwarding paths and outputs them to an outside of the network, traffic may increase by a factor of two times during a predetermined amount of time, compared to what is set in the regulation, and thus a service of a corresponding packet may be suspended by a process based on a violation of the regulation and the time-deterministic packet forwarding function itself may not be enabled.

In example embodiments to be described hereinafter, it is assumed for the convenience of description that the first forwarding path and the second forwarding path that are based on a TSN network, which is an Ethernet-based time-deterministic packet network, and have different packet forwarding delay times for lossless forwarding are set. Although the respective forwarding delay times of the forwarding paths are different from each other, it is assumed for the convenience of description that a forwarding delay difference or deviation between the first forwarding path and the second forwarding path corresponds to a time to be used to forward ten packets.

The example embodiments may be applicable to all types of lossless forwarding methods including, for example, a frame replication and elimination for reliability (FRER) of TSN, and a packet replication and elimination function (PREF) or a packet replication, elimination, and ordering function (PREOF) of DetNet, by which the transmitting node replicates packets and transmits them to two or more forwarding paths and the receiving node eliminates a duplicate packet by verifying a sequence number.

In addition, the example embodiments may also be applicable to a lossless forwarding method based on frame replication and elimination in a circuit transport network such as, for example, a synchronous digital hierarchy (SDH) and an optical transport network (OTN), in addition to a packet network.

Figure 2:
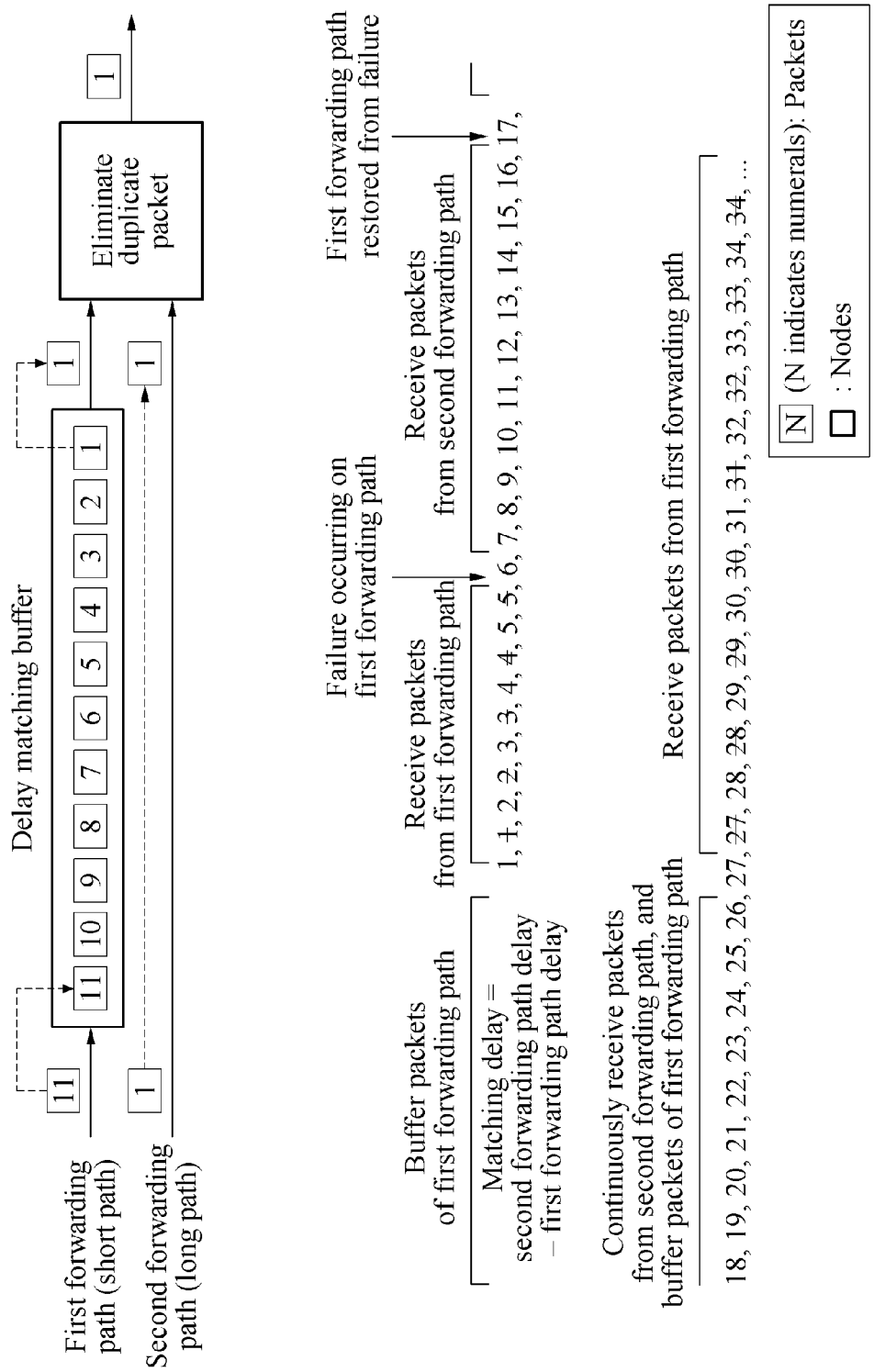
FIG. 2 is a diagram illustrating an example of a lossless traffic forwarding method using distributed delay offset matching according to an example embodiment.

FIG. 2 is a diagram illustrating an example of a lossless traffic forwarding method using distributed delay offset matching according to an example embodiment.

A lossless traffic forwarding method may use a delay matching buffer. The delay matching buffer may be disposed on a first forwarding path. In addition, the delay matching buffer may be disposed in a receiving node on the first forwarding path. That is, the delay matching buffer may be disposed at any point on the first forwarding path.

The delay matching buffer may buffer packets to be forwarded from the first forwarding path by an extent of a delay offset. The delay offset may indicate a delay variation. For example, the delay offset indicates the delay variation, which may be a difference in terms of forwarding delay time between the first forwarding path and a second forwarding path. That is, the delay matching buffer may store packets by an extent of the difference in terms of forwarding delay time between the first forwarding path and the second forwarding path, and then forward the stored packets.

For example, as illustrated in FIG. 2, the delay matching buffer may store packets by an extent of the delay offset by applying a timer to traffic received through the first forwarding path, and then forward the stored packets. In this example, the delay offset may indicate a time needed to receive ten packets. Through this, a block for a function of eliminating a duplicate packet of the receiving node may receive packets of permanently same sequence numbers from the first forwarding path and the second forwarding path.

The delay matching buffer may offset a delay deviation between the first forwarding path and the second forwarding path by buffering and forwarding packets by the delay offset on the first forwarding path. As illustrated in FIG. 2, when a forwarding delay time of the first forwarding path and a forwarding delay time of the second forwarding path are matched to each other, the packets of the permanently same sequence numbers may be successively received from the first forwarding path and the second forwarding path, and it is thus possible to solve potential issues that may occur when a failure occurs on a forwarding path or the forwarding path is restored from the failure.

The method of using the delay matching buffer described above may include delaying the forwarding delay time of the first forwarding path by that of the second forwarding path. Applications to a terminal device that require a lossless forwarding characteristic, for example, real-time remote control, may implement a control program based on the forwarding delay time of the second forwarding path in consideration of a packet forwarding delay time under a worst condition, and thus a delay on the first forwarding path may not be a significant issue.

The delay matching buffer may be implemented in the receiving node, or in at least one node on the first forwarding path. Here, the delay matching buffer may use a buffer resource provided by each node, and effectively correct a delay deviation. Here, a method of matching a delay deviation by the delay matching buffer being distributed at each node on the first forwarding path may also be referred to as a distributed delay deviation matching method. Based on a fact that the delay matching buffer may be disposed on any locations on a network, such method may be more effective in terms of system costs compared to a method of correcting all delay deviations by the receiving node.

The distributed delay deviation matching method may use buffer resources provided by each of nodes on the first forwarding path including the receiving node to effectively correct a delay deviation. The distributed delay deviation matching method may be controlled and/or managed by a centralized control/management device such as a software-defined networking (SDN) controller.

Figure 3:
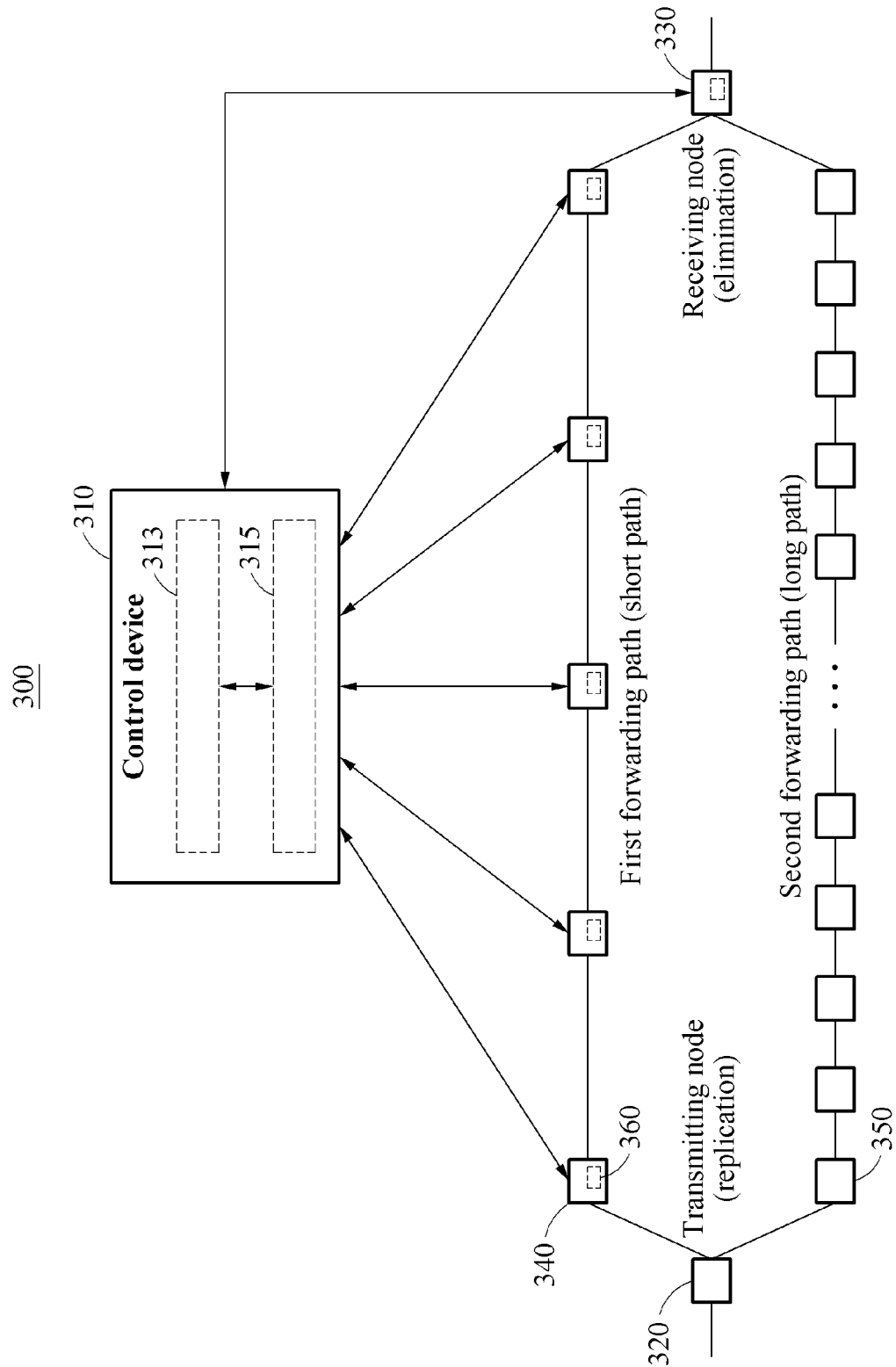
FIG. 3 is a diagram illustrating an example of a network system using distributed delay offset matching according to an example embodiment.

FIG. 3 is a diagram illustrating an example of a network system using distributed delay offset matching according to an example embodiment.

Referring to FIG. 3, a network system 300 includes a control device 310, a transmitting node 320, a receiving node 330, and intermediate nodes 340 and 350. The intermediate nodes 340 are disposed on a first forwarding path, and the intermediate nodes 350 are disposed on a second forwarding path. A delay matching buffer 360 is disposed in at least one of the intermediate nodes 340 on the first forwarding path, and/or in the receiving node 330.

The control device 310 may be an SDN controller configured to control an overall operation of the network system 300. The control device 310 may control distributed delay offset matching using the delay matching buffer 360. The control device 310 includes a controller 313 and a communication module 315. The controller 313 may communicate with each of the nodes 320 through 350 through the communication module 315.

A series of packets that requires, requests, or ensures lossless forwarding or a lossless forwarding function may be defined as a flow. For each flow, the controller 313 may collect node information and link information from the intermediate nodes 340 and 350 included in the first forwarding path and the second forwarding path, and calculate a forwarding delay offset of the first forwarding path and the second forwarding path based on the collected node information and link information.

A forwarding delay time may be calculated by a sum of all link delay times and node delay times on a forwarding path between the transmitting node 320 and the receiving node 330.

A link delay time may be proportional to a physical length of a link. For example, for a general optical fiber cable, a delay of approximately 5 microseconds ($\mu$s) may occur per 1 kilometer (km). Such link delay time may be calculated by measuring a length of the cable, or measured by using a method of measuring a separate delay time at each of both nodes connected to the link.

A node delay time may vary depending on a characteristic of a packet processing operation of a node. For example, for a bridge system defined in TSN, the node delay time may be calculated by a value obtained from a dependent delay$\times$a sum of a time-sensitive traffic packet size and an independent delay. In this example, the dependent delay refers to a time used to forward a single packet to an output queue after storing the single packet in a memory of the node. Here, a time used to store, in the memory, a single packet received as a series bit string through an input port may be determined by a link speed of the input port and a size of the packet. In addition, the independent delay refers to a delay time irrelevant to a packet length, and indicates a time used for packet processing including, for example, packet overhead lookup in the node and forwarding determination.

When a node uses an IEEE Std 802.1 QbvTM-2015 time-aware shaper (TAS) or an IEEE Std 802.1QchTM-2017 cyclic queuing and forwarding (CQF), which is a time-deterministic packet forwarding method defined in the TSN, a forwarding delay time may be calculated in a way different from what has been described in the foregoing. The methods described in the foregoing may perform, by an output port, an operation of opening or closing a gate based on a traffic transmission period unit for each traffic class queue, and thus a node forwarding delay time of one node on a path may vary based on the traffic transmission period unit due to a difference between a delay time from the transmitting node 320 to the node and a point in time at which the gate is opened.

In the methods described in the foregoing, the forwarding delay time of the path may be calculated by the controller 313 using information associated with flow attributes (e.g., traffic transmission period, the number of packets per transmission cycle or period, and a maximum packet size), the number of intermediate nodes on the path, a link delay time, a packet forwarding method used by each node, and the like.

The controller 313 may calculate a delay offset based on a forwarding delay time of the first forwarding path and a forwarding delay time of the second forwarding path. The controller 313 may control the delay matching buffer 360 on the first forwarding path based on the delay offset, and distribute and delay packets to be forwarded on the first forwarding path by an extent of the delay offset.

The controller 313 may control the delay matching buffer 360 using the following parameters.

B(k): indicates a size of the delay matching buffer 360 that may be provided by a node k for delay offset matching, for example, information to be provided by the node k to the control device 310.

Such parameter information may be transmitted to the controller 313 by being included in node information.

Delay(k,i): indicates a delay time of a packet belonging to a flow i in the delay matching buffer 360 of the node k, for example, information to be provided by the control device 310 to the node k.

Such parameter information may be transmitted to the node k by being included in a control signal of the controller 313.

As described above, the controller 313 may distribute and delay packets using the delay matching buffer 360 properly based on packet forwarding methods of the intermediate nodes 340 on the first forwarding path and the receiving node 330, and thus match the forwarding delay times of the first forwarding path and the second forwarding path.

Figure 4:
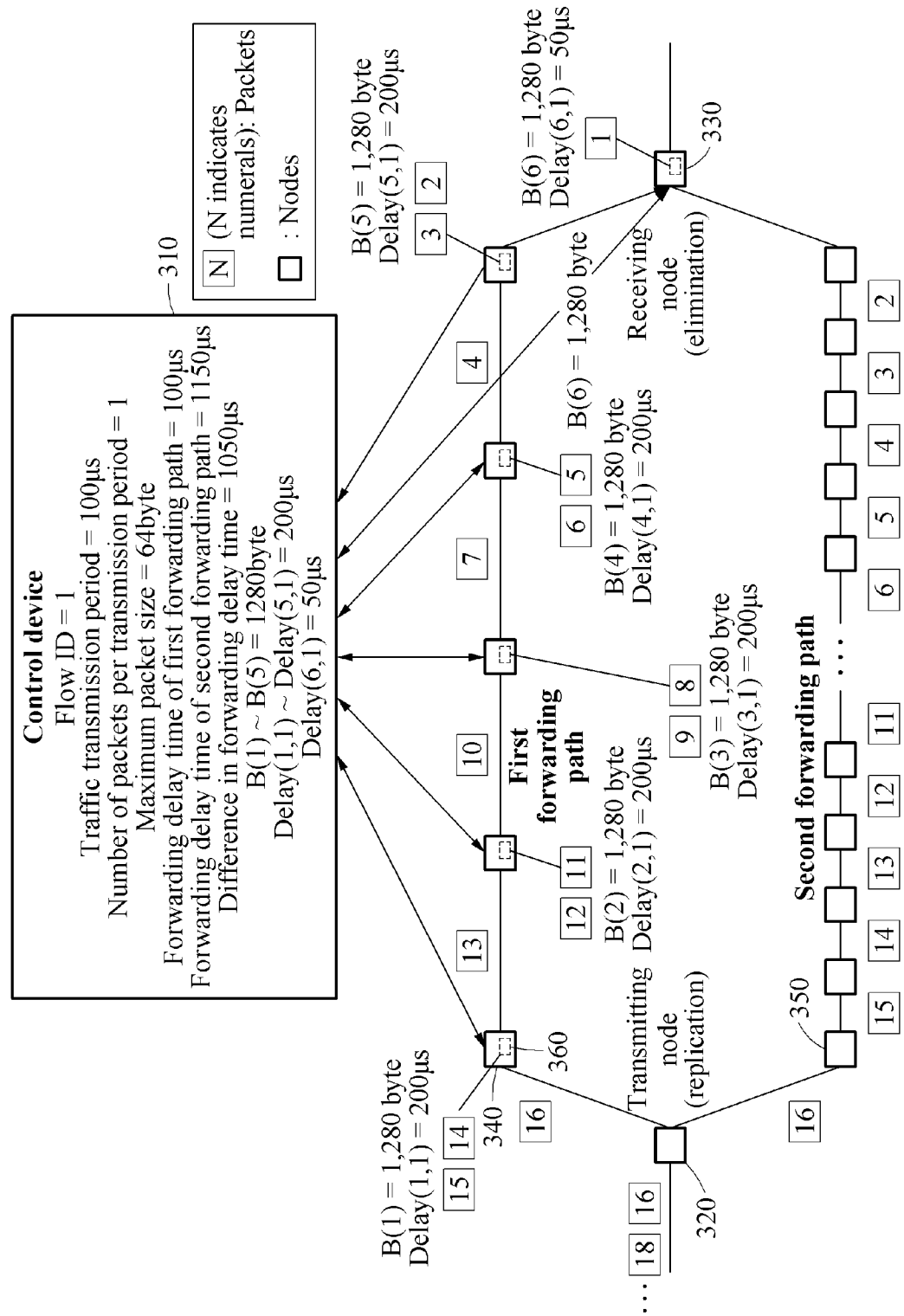
FIG. 4 is a diagram illustrating an example of a lossless traffic forwarding method using distributed delay offset matching by the network system illustrated in FIG. 3.

FIG. 4 is a diagram illustrating an example of a lossless traffic forwarding method using distributed delay offset matching by the network system 300 illustrated in FIG. 3.

In the example of FIG. 4, it is assumed that the control device 310, the transmitting node 320, the receiving node 330, and the intermediate nodes 340 on the first forwarding path are aware of attributes of a flow i, for example, a traffic transmission period, the number of packets per transmission period, and a maximum packet size.

The control device 310 may calculate a forwarding delay time of the first forwarding path, and calculate a forwarding delay time of the second forwarding path. The control device 310 may calculate a delay offset (ΔDelay) based on the calculated forwarding delay times of the first and second forwarding paths. The control device 310 may perform distributed delay offset matching based on the calculated delay offset ΔDelay as follows.

First, the intermediate nodes 340 on the first forwarding path and the receiving node 330 may forward, to the control device 310, size information B(k) of the delay matching buffer 360 that is available. The control device 310 may convert a value of the size information B(k) to a delay time value based on the attributes of the flow i. For example, when B(k)=640 bytes, and the attributes of the flow i are defined to transmit one 64-byte packet per traffic transmission period of 100 μs, a delay time obtained through the converting may be 640 byte/64 byte×100 μs=1,000 μs. The control device 310 may provide, to each of the nodes 330 and 340, delay time information Delay(k,i) of the flow i within a delay time range that is provided by the nodes 330 and 340 according to the following regulations.

Delay(k,i) of an intermediate node=a value of a traffic transmission period unit Delay(k,i) of a receiving node=ΔDelay−ΣDelay(k,i) of the intermediate node When the intermediate nodes 340 on the first forwarding path and the receiving node 330 perform buffering as described above, the forwarding delay time of the first forwarding path and the forwarding delay time of the second forwarding path may be matched to each other.

The intermediate nodes 340 may delay packets by a traffic transmission period unit. This is because, even when the delay matching buffer 360 delays packets by an arbitrary value, an output port using a time-deterministic packet forwarding method may control a gate by the traffic transmission period unit, and thus a node forwarding delay time may be different from a value set by the control device 310.

FIG. 4 illustrates an example of a distributed delay deviation matching method for a flow i that transmits one 64-byte packet per 100 μs. In this example, there are five intermediate nodes 340 on the first forwarding path, and the intermediate nodes 340 have the same available delay matching buffer 360 of 1280 bytes as the receiving node 330. In addition, a difference in terms of forwarding delay time between the first forwarding path and the second forwarding path is 1050 μs.

Each of the nodes 330 and 340 may inform the control device 310 of 1280 as a parameter value of B(k). The control device 310 may convert the parameter value of B(k) to a delay time for the flow i, and thus recognize that it is possible to delay by 2000 μs (1280 byte/64 byte×100 μs) for each of the nodes 330 and 340. To compensate for a delay offset of 1050 μs between the first forwarding path and the second forwarding path, the control device 310 may set a delay time of the intermediate nodes 340 and the receiving node 330 through various distribution methods under a condition satisfying the regulations described above.

In the example of FIG. 4, the control device 310 may provide a delay time of 200 μs, which is double a traffic transmission period, as a Delay(k,i) parameter to all the intermediate nodes 340, and provides remaining 50 μs as a Delay(k,i) parameter to the receiving node 330, in order to match the forwarding delay time of the first forwarding path and the forwarding delay time of the second forwarding path.

Figure 5:
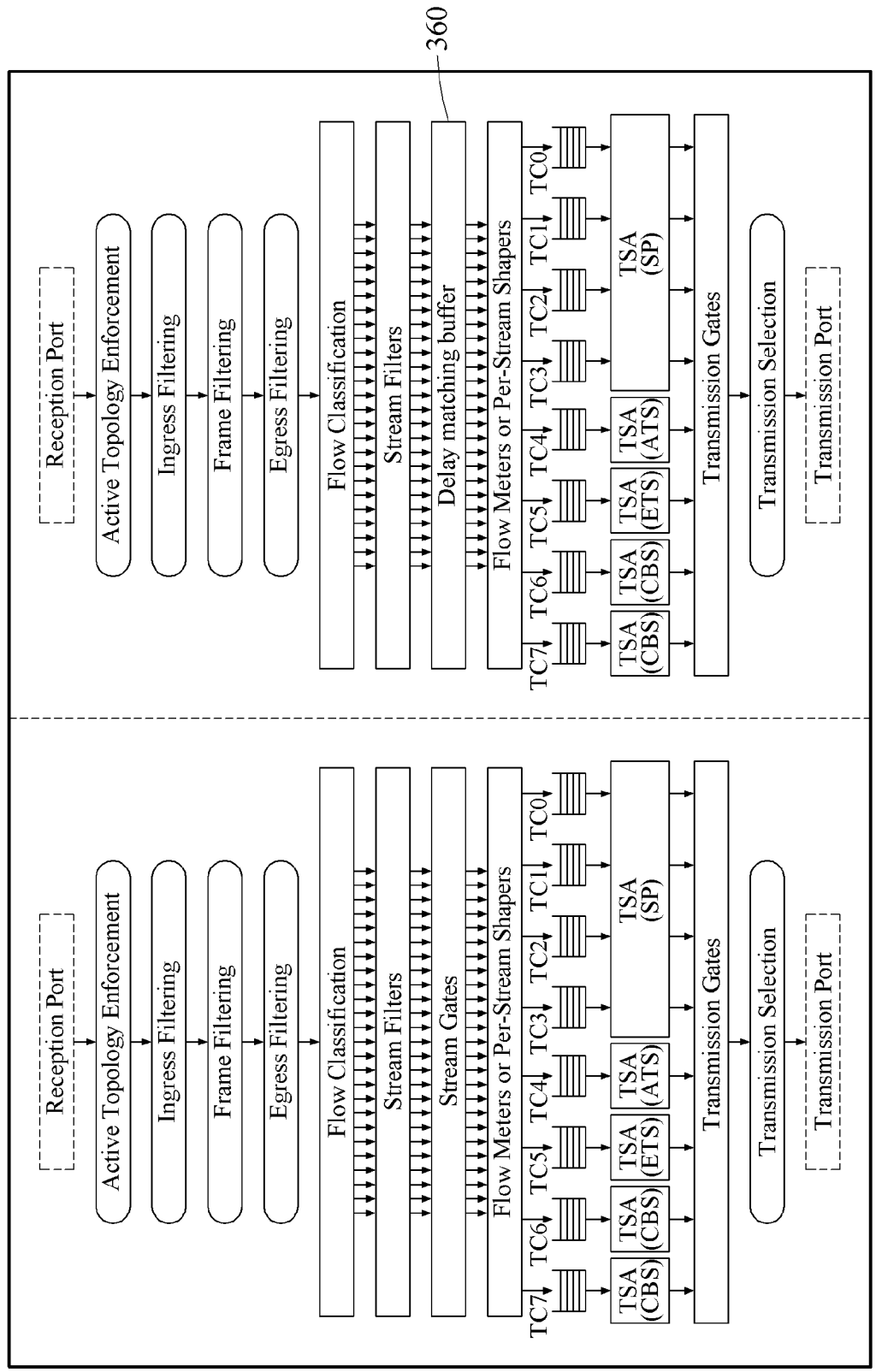
FIG. 5 is a diagram illustrating an example of a delay matching buffer according to an example embodiment.

FIG. 5 is a diagram illustrating an example of a delay matching buffer according to an example embodiment.

The delay matching buffer 360 may be configured in various types according to an example embodiment. For example, in a bridge function model defined in IEEE 802.1, a function of the delay matching buffer 360 may be between a stream filter that performs a flow classifying function and a stream gate that is responsible for a queuing function, as illustrated in FIG. 5.

As described above, in a network that requires lossless traffic forwarding, by distributing delay times of different forwarding paths through SDN-based centralized control/management and matching them to respective nodes through buffering, it is possible to resolve such issues as a temporarily changed packet forwarding order and a double amount of packets than a set amount being forwarded, in the event that packet forwarding is temporarily suspended due to a failure on a path or restoration of the path from the failure.

Thus, according to example embodiments described herein, it is possible to provide a significantly stable lossless forwarding function and use network resources more effectively, and enable time-sensitive traffic to be forwarded without a loss.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A lossless packet forwarding method, comprising:
   calculating a delay offset between a first forwarding path between a transmitting node and a receiving node and a second forwarding path between the transmitting node and the receiving node; and
   controlling a buffer resource by an extent of the delay offset to delay packets to be forwarded on the first forwarding path;
   wherein the controlling comprises:
   receiving size information of the buffer resource from a node at which the buffer resource is disposed; and
   generating delay time information for delaying a packet through the buffer resource based on the size information; and
   wherein the generating of the delay time information comprises:
   when the node at which the buffer resource is disposed is an intermediate node disposed between the transmitting node and the receiving node, generating delay time information of the intermediate node by a value of a traffic transmission period unit; and
   when the node at which the buffer resource is disposed is the receiving node, generating, as delay time information of the receiving node, a difference between the delay offset and the delay time information of the intermediate node.

2. The lossless packet forwarding method of claim 1, wherein the calculating comprises:
   calculating a forwarding delay time of the first forwarding path;
   calculating a forwarding delay time of the second forwarding path; and
   calculating the delay offset based on the forwarding delay time of the first forwarding path and the forwarding delay time of the second forwarding path.

3. The lossless packet forwarding method of claim 1, wherein the delay offset is a difference between a forwarding delay time of the first forwarding path and a forwarding delay time of the second forwarding path.

4. The lossless packet forwarding method of claim 1, wherein the buffer resource is disposed in at least one of nodes disposed on the first forwarding path.

5. The lossless packet forwarding method of claim 4, wherein the nodes include intermediate nodes disposed between the transmitting node and the receiving node, and the receiving node.

6. The lossless packet forwarding method of claim 1, wherein the controlling further comprises:
   transmitting the delay time information to the node at which the buffer resource is disposed.

7. The lossless packet forwarding method of claim 1, wherein the size information of the buffer resource is available size information of the buffer resource.

8. A control device comprising at least one processor and instructions stored on a non-transitory computer-readable medium, the at least one processor and the instructions being configured to implement:
   a communication module configured to communicate with a transmitting node and a receiving node; and
   a controller configured to calculate a delay offset between a first forwarding path between the transmitting node and the receiving node and a second forwarding path between the transmitting node and the receiving node, and control a buffer resource by an extent of the delay offset to delay packets to be forwarded on the first forwarding path;
   wherein the controller is configured to receive size information of the buffer resource from a node at which the buffer resource is disposed through the communication module, and generate delay time information for delaying a packet through the buffer resource based on the size information; and wherein the controller is configured to:

when the node at which the buffer resource is disposed is an intermediate node disposed between the transmitting node and the receiving node, generate delay time information of the intermediate node by a value of a traffic transmission period unit; and when the node at which the buffer resource is disposed is the receiving node, generate, as delay time information of the receiving node, a difference between the delay offset and the delay time information of the intermediate node.

9. The control device of claim 8, wherein the controller is configured to calculate a forwarding delay time of the first forwarding path and a forwarding delay time of the second forwarding path, and calculate the delay offset based on the forwarding delay time of the first forwarding path and the forwarding delay time of the second forwarding path.

10. The control device of claim 8, wherein the delay offset is a difference between a forwarding delay time of the first forwarding path and a forwarding delay time of the second forwarding path.

11. The control device of claim 8, wherein the buffer resource is disposed in at least one of nodes disposed on the first forwarding path.

12. The control device of claim 11, wherein the nodes include intermediate nodes disposed between the transmitting node and the receiving node, and the receiving node.

13. The control device of claim 8, wherein the controller is configured to transmit the delay time information to the node at which the buffer resource is disposed.

14. The control device of claim 8, wherein the size information of the buffer resource is available size information of the buffer resource.

* * * * *